C. H. HOWARD.
BAG MAKING MACHINE.
APPLICATION FILED MAR. 12, 1919.
1,365,494.
Patented Jan. 11, 1921.
10 SHEETS—SHEET 7.
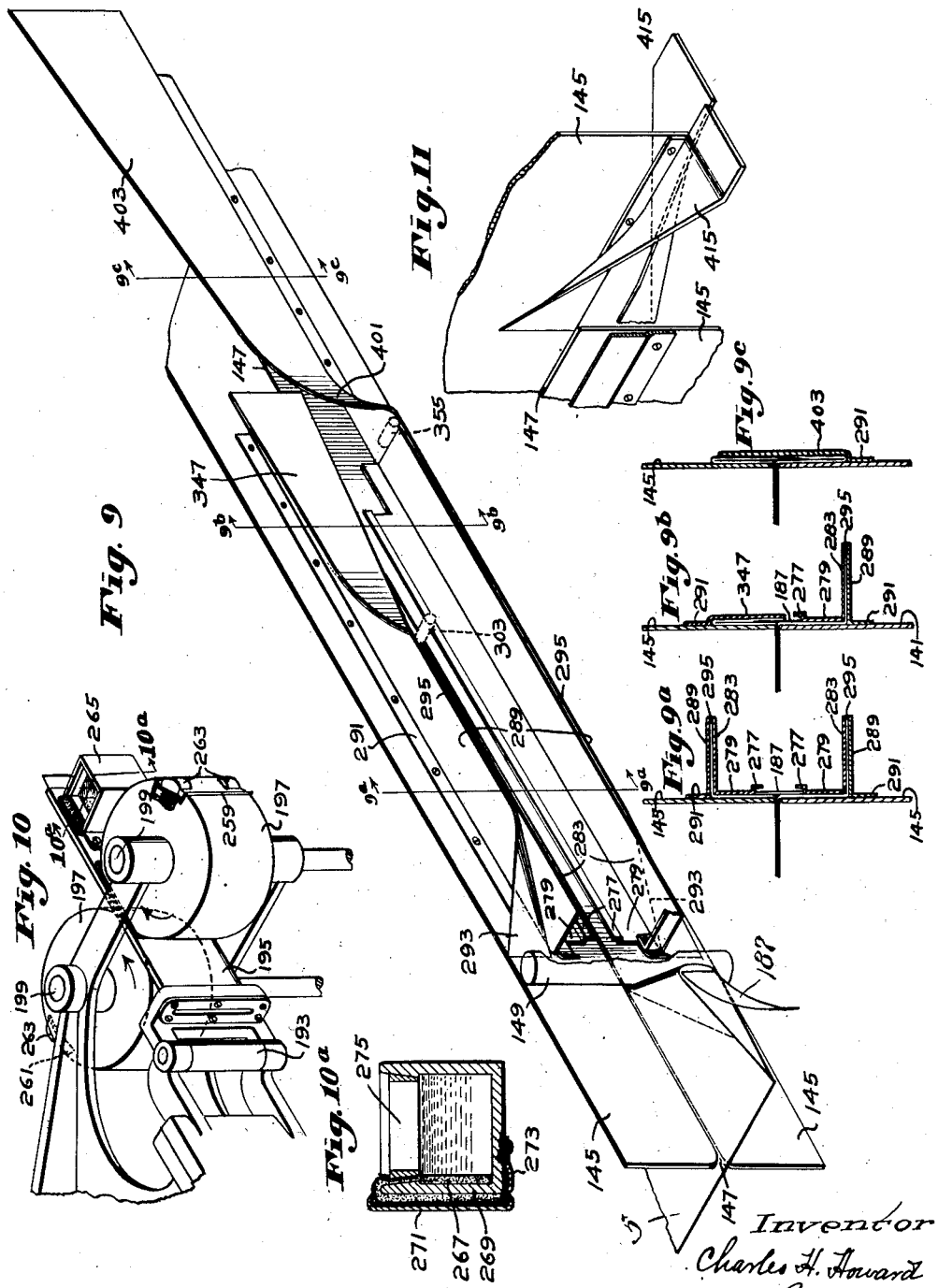

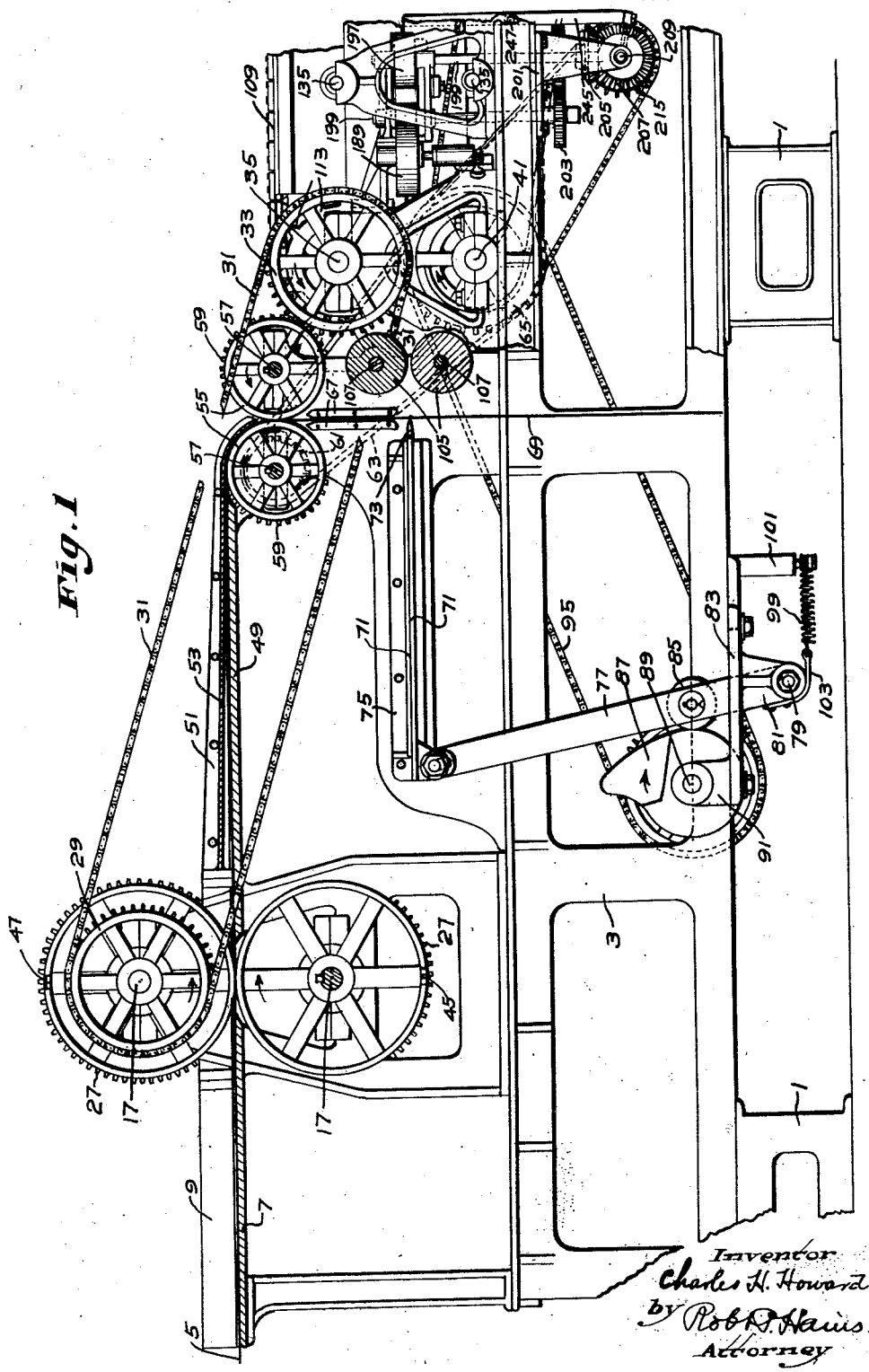

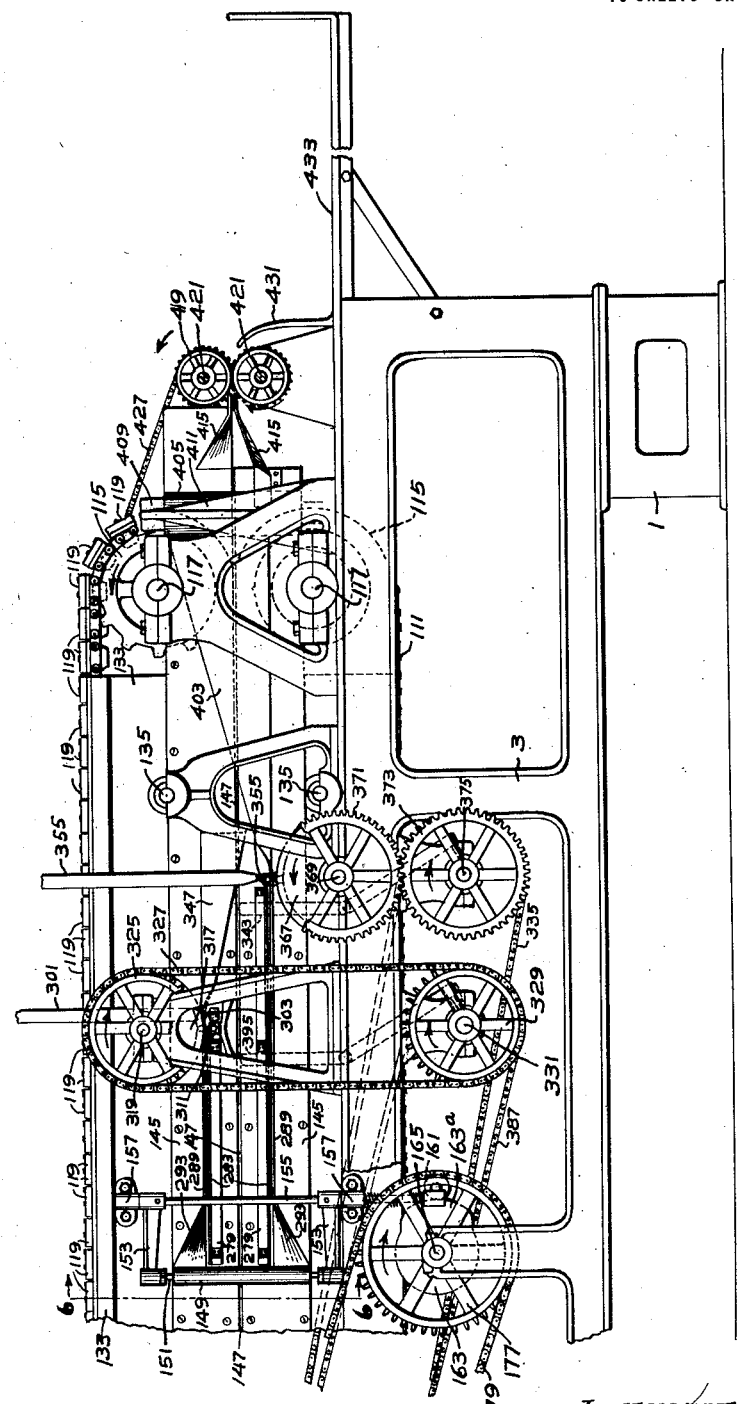

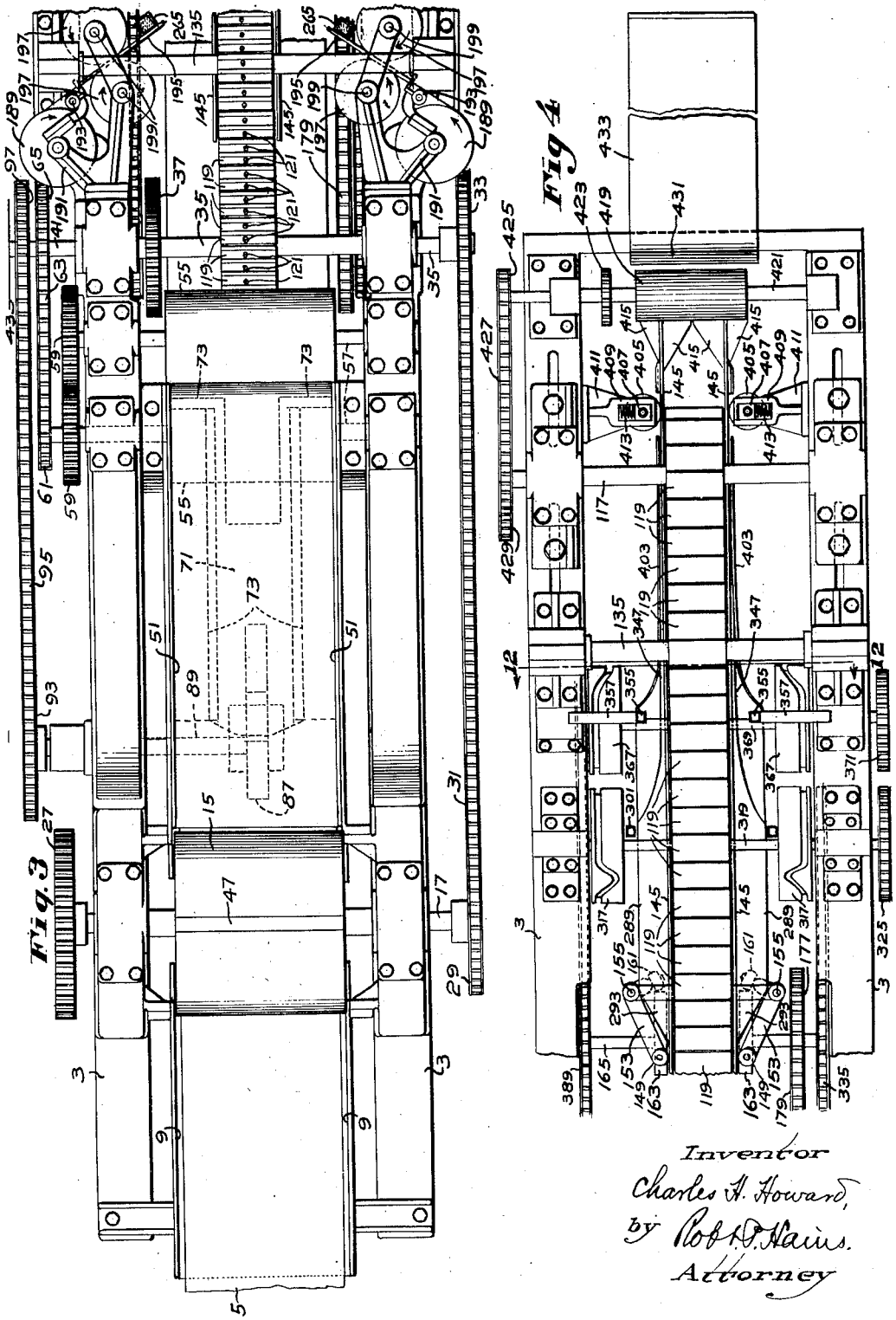

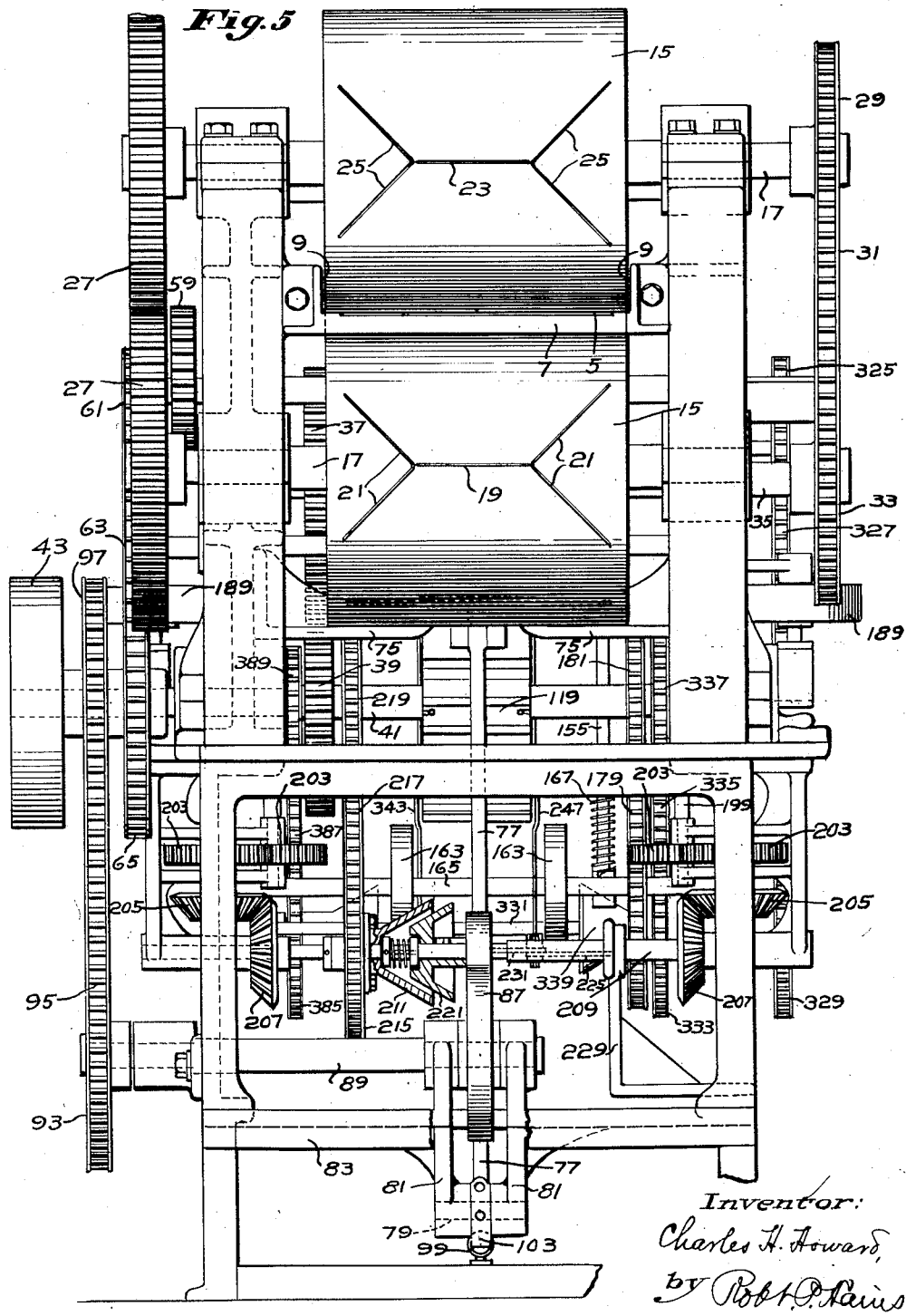

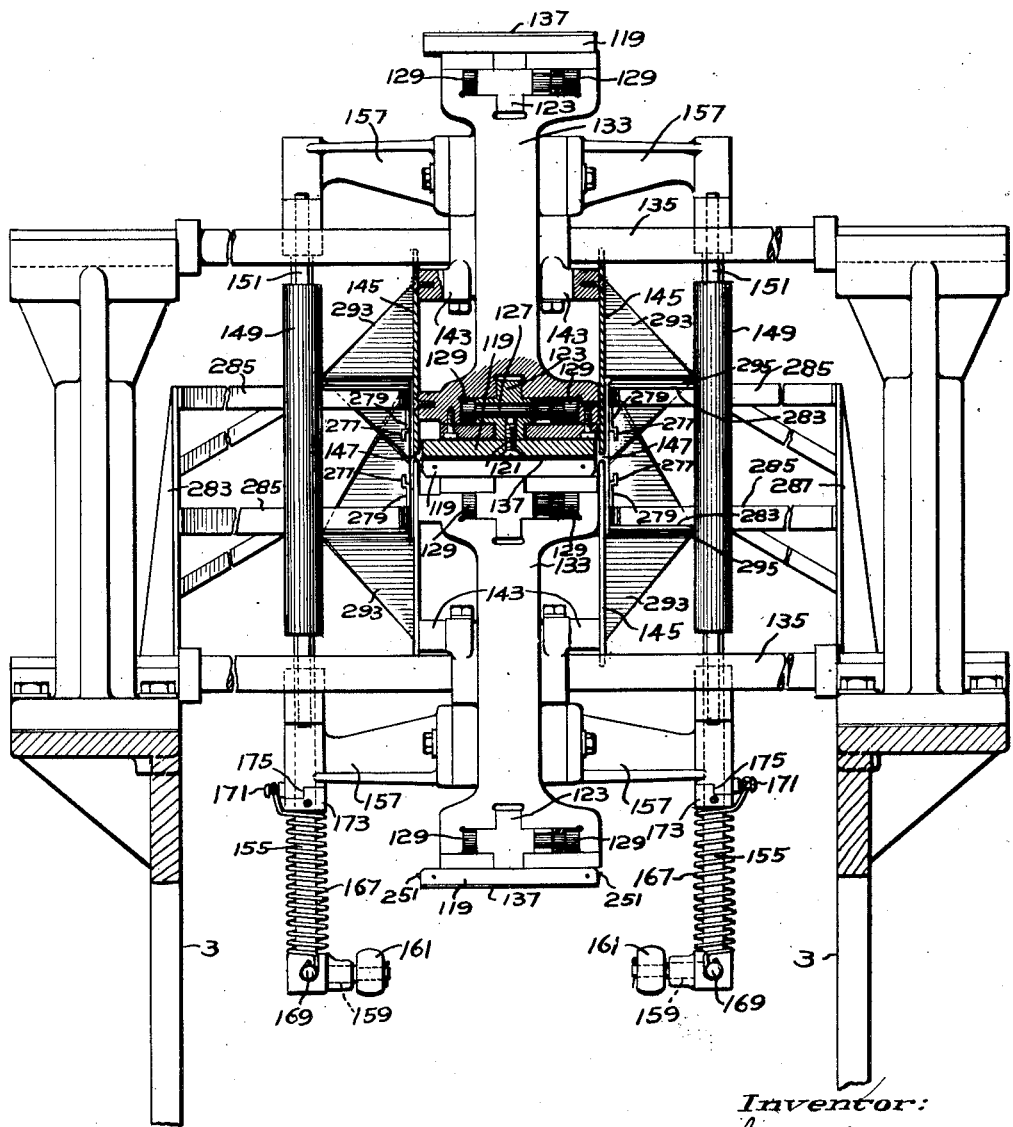

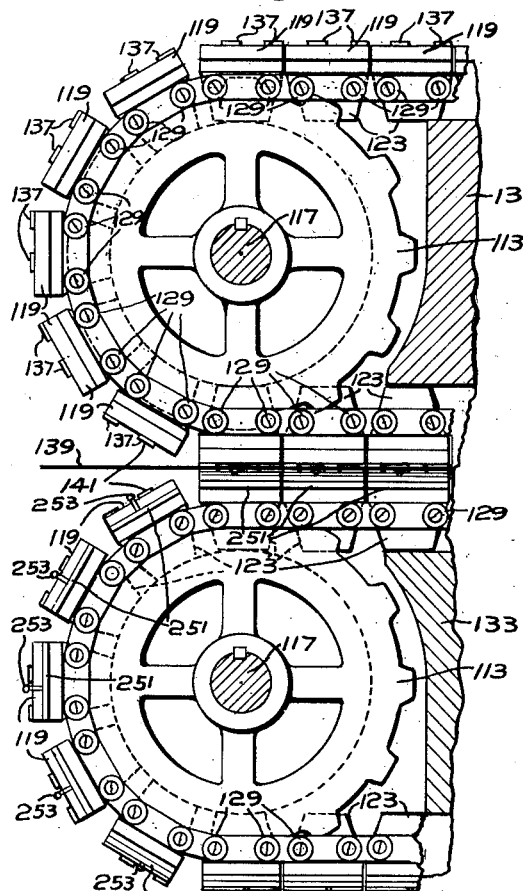
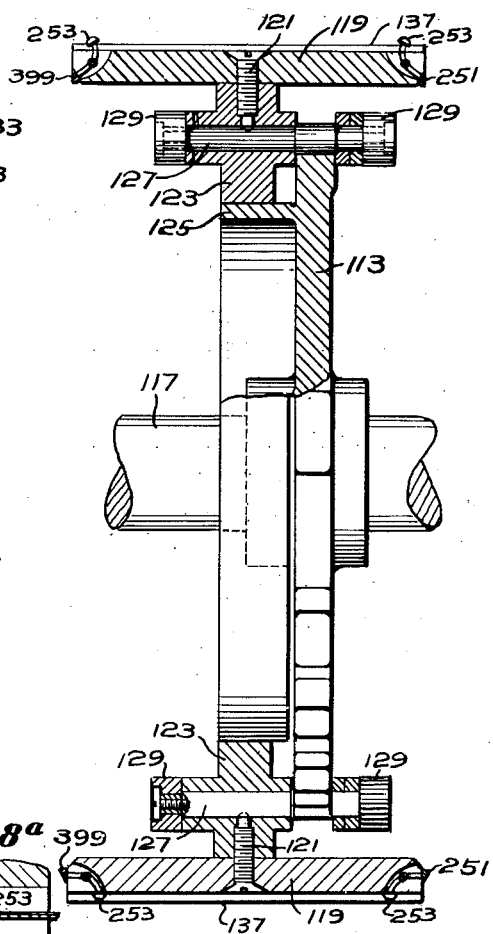
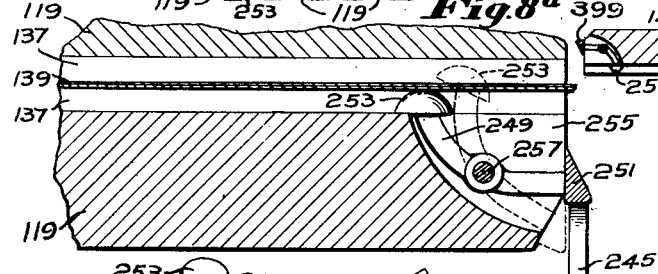
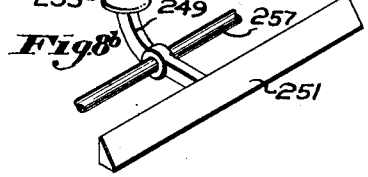

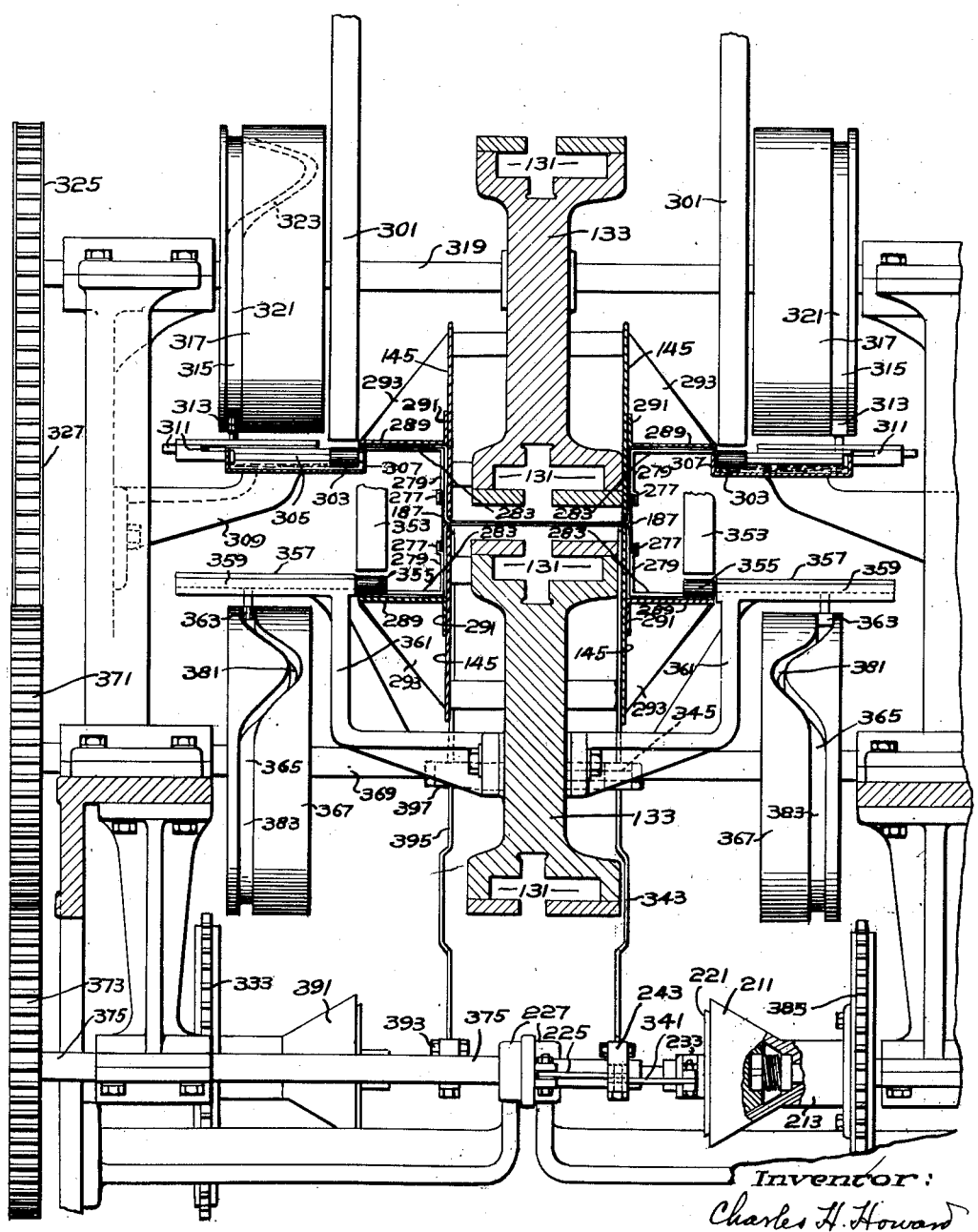

C. H. HOWARD.
BAG MAKING MACHINE.
APPLICATION FILED MAR. 12, 1919.

1,365,494.

Patented Jan. 11, 1921.
10 SHEETS—SHEET 9.

Inventor
Charles H. Howard,
by Rob't G. Hains.
Attorney

C. H. HOWARD.
BAG MAKING MACHINE.
APPLICATION FILED MAR. 12, 1919.
1,365,494.
Patented Jan. 11, 1921.
10 SHEETS—SHEET 10.
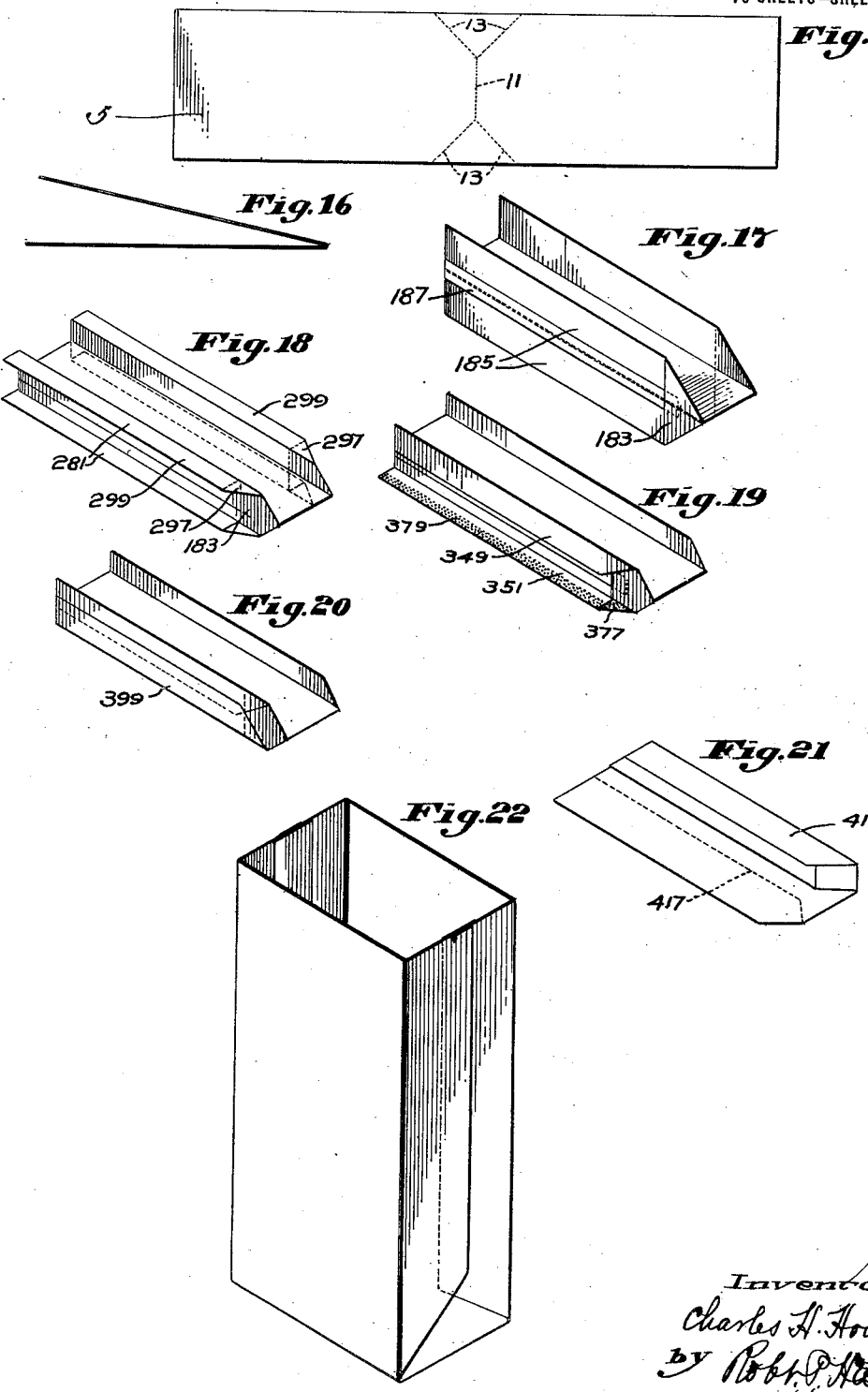

UNITED STATES PATENT OFFICE.

CHARLES H. HOWARD, OF SAUGUS, MASSACHUSETTS, ASSIGNOR TO PAPER PRODUCTS MACHINE COMPANY, OF BOSTON, MASSACHUSETTS, A CORPORATION OF MASSACHUSETTS.

BAG-MAKING MACHINE.

1,365,494.   Specification of Letters Patent.   Patented Jan. 11, 1921.

Application filed March 12, 1919. Serial No. 282,113.

*To all whom it may concern:*

Be it known that I, CHARLES H. HOWARD, a citizen of the United States, residing at Saugus, in the county of Essex and State of Massachusetts, have invented an improvement in Bag-Making Machines, of which the following description, in connection with the accompanying drawings, is a specification, like characters on the drawings representing like parts.

The invention to be hereinafter described relates to bag making machines.

One of the purposes of the invention is to provide an efficient machine for taking successive blanks and rapidly folding the same automatically to produce bags. The character of the bag made may vary, but in the present instance, a bag is produced by folding a blank transversely to form opposed sides of a bag, and by folding margins of the sides over into overlapped relation and securing said margins together.

The material used in the production of the bag may vary, but preferably paper is employed which may be reinforced by providing superposed paper sheets having reinforcing threads, wires, strings or fibers therebetween, and extending either longitudinally or transversely thereof, or both longitudinally and transversely thereof as desired. The sheets may be secured together by a suitable adhesive which may be black asphaltum or other waterproof adhesive as desired.

When a waterproof bag is to be made, it is not only essential that the paper shall be waterproof, but also that the seams formed by the overlapped margins of the bag shall be waterproof. Accordingly, waterproof adhesive is desirably used to secure the margins together and prevent ingress of water through the seams.

Frequently these bags are used as containers for heavy materials, such, for example, as cement, and therefore, it is important that the margins of the sides of the bag shall be strongly secured together. To accomplish this, strips may be introduced into the interior of the bag and have faces secured by a strong adhesive to inner surfaces of the margins of the sides of the bag and serve as strong connections for said margins.

Another object of the invention, therefore, is to provide a machine which will not only fold over and adhesively secure the margins of the sides of the bag together, but also will apply and secure the aforesaid strips to the bag.

And still another object of the invention, is to fold the bag after being formed into collapsed flat condition, in order that the bags may be readily stacked.

With the aforesaid and other objects in view, the character of the invention will be best understood by reference to the following description of one good form of machine for carrying the invention into practical effect shown in the accompanying drawings, wherein:—

Figures 1 and 2 taken together, are a side elevation of the machine, certain parts being shown in section;

Figs. 3 and 4 taken together are a plan of the machine;

Fig. 5 on an enlarged scale is an end elevation of the feeding-in end of the machine;

Fig. 6 on an enlarged scale is a vertical transverse section taken on line 6—6 of Fig. 2;

Fig. 7 is a vertical sectional view showing portions of the upper and lower feed belts for the folded bag blank;

Fig. 8 is a view partly in elevation and partly in transverse section of parts shown in Fig. 7;

Figure 13:
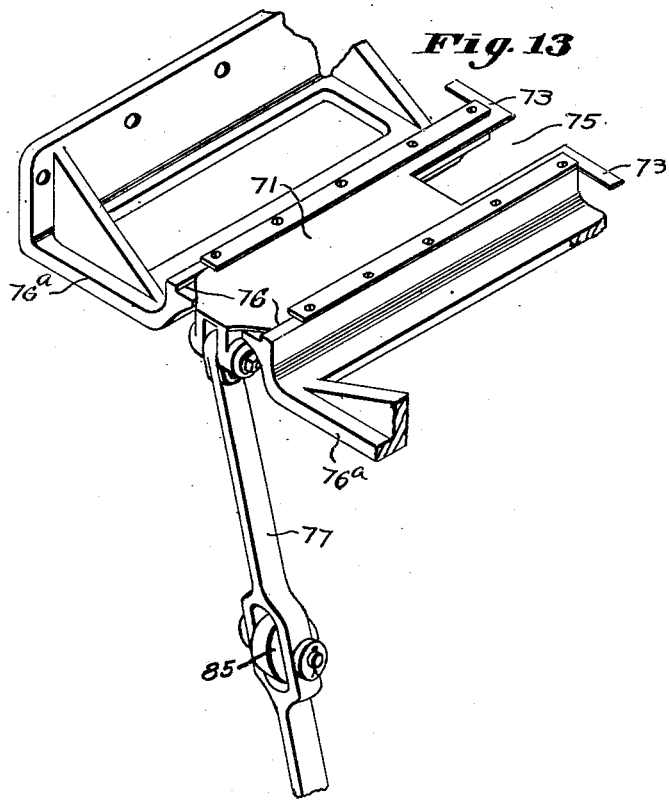
Figure 14:
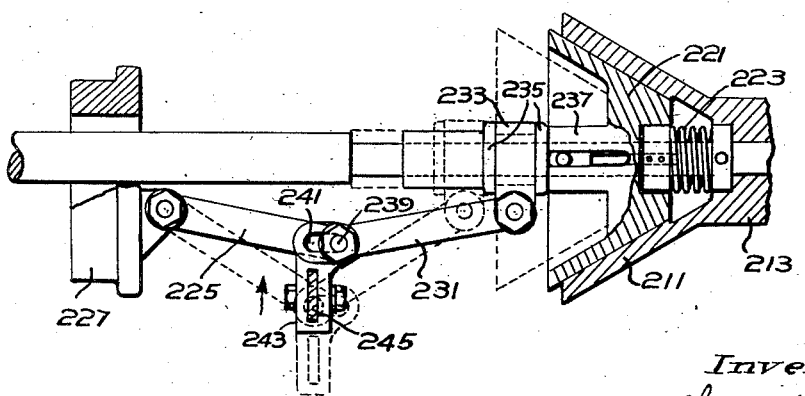

Fig. 8$^a$ on an enlarged scale is a section taken through one of the feet of the lower belt and illustrating one of the clutch lever actuating devices controlled by the bag blank;

Fig. 8$^b$ is a perspective view of the actuating device shown in Fig. 8$^a$;

Fig. 9 is a perspective view showing the disposition of folding plates employed for folding over margins of opposed sides of the bag into overlapped relation;

Fig. 9$^a$ is a vertical transverse section taken on line 9$^a$—9$^a$ of Fig. 9;

Fig. 9$^b$ is a vertical transverse section taken on line 9$^b$—9$^b$ of Fig. 9;

Fig. 9$^c$ is a vertical transverse section taken on line 9$^c$—9$^c$ of Fig. 9;

Fig. 10 is a perspective view of a portion of one of the strip feeding and moistening devices;

Fig. 10$^a$ on an enlarged scale is a vertical section taken on line 10$^a$—10$^a$ of Fig. 10;

Fig. 11 is a perspective detail of the arrangement of folding plates for folding the bag after being formed into collapsed flat condition;

Fig. 12 on an enlarged scale is a vertical section taken on line 12—12 of Fig. 4;

Fig. 13 is a perspective view of the device for folding the bag blank to form opposed sides of the bag;

Fig. 14 is a sectional detail on an enlarged scale of a clutch mechanism employed in the machine;

Figs. 15 to 21 illustrate successive steps in the production of a bag from a blank; and Fig. 22 is a perspective view of a bag which may be produced by the machine.

Referring to the drawings, the machine selected as one embodiment of the invention may be provided with any suitable frame or support for the various instrumentalities of the machine. In the present instance of the invention, this frame comprises base plates 1 supporting side frames 3 which may be connected and braced at intervals by appropriate transverse members.

The blanks for the bags may be formed of the appropriate shape by any suitable means, but to accomplish this, in the present instance of the invention, a sheet 5 (Fig. 1) of appropriate material is provided of suitable width and is fed along a table 7 mounted on the frame and provided with edge guides 9.

To facilitate subsequent folding of the material to form opposed sides of the bag, suitable means may be provided for creasing the sheet 5 transversely thereof as indicated by the dotted lines 11 and 13 in Fig. 15. To accomplish this, in the present instance of the invention, upper and lower rolls 15 may be provided mounted on shafts 17 journaled in bearings in the side frames of the machine. The lower roll 15 has a rib 19 parallel to the axis of said roll, and ribs 21 diverging from the opposite ends of the rib 19, and the upper roll has a groove 23 parallel to the axis of said roll and grooves 25 diverging from the opposite ends of the groove 23. The construction is such that in the course of the rotation of said rolls, the ribs on the lower roll will mate with the grooves on the upper roll and produce the creases 11 and 13 in the sheet as indicated in Fig. 15.

To rotate the rolls 15, they may have intermeshing gears 27 (Figs. 1 and 5) fast on the shafts 17, and the upper shaft may have a sprocket wheel 29 fast thereon connected by a sprocket chain 31 with a sprocket wheel 33 fast on a shaft 35 journaled in bearings in the side frames. The shaft 35 has a gear 37 (Fig. 3) meshing with a gear 39 beneath it and fast on the main shaft 41 of the machine journaled in bearings in the side frames. At one end of this shaft is a pulley 43 adapted to be driven by a belt (not shown) from any suitable source of power.

Suitable means may be provided for severing the sheet 5 at appropriate intervals transversely to the length thereof to produce blanks of the appropriate length. To accomplish this, in the present instance of the invention, each of the rolls 15 is of a size such that the circumference thereof equals the length of a bag blank, and the lower roll is provided with a knife 45 (Fig. 1) coöperating with an anvil 47 on the upper roll, the construction being such that once in the course of a complete rotation of said rolls, the knife 45 will coöperate with the anvil 47 and sever the sheet transversely thereof. The knife 45 should be located on the lower roll diametrically opposed to the crease forming projections 19 and 21 thereof, in order that the crease 11 may be made midway between the ends of a blank.

After a blank has been creased and cut as described, it is desirable that it shall be folded on the crease 11 to form opposed sides of the bag. To accomplish this, a table 49 (Fig. 1) may be mounted on the side frames and extend beyond the creasing and cutting rolls and constitute in effect a continuation of the table 7 referred to. Rising from the table 49 are edge guide plates 51 which may be connected by an inclined plate 53 spaced a slight distance above the table 49 to prevent buckling of the blank during its transit over said table. The forward end of the plate 53 may be curved downward to deflect the blank to and between a pair of feed rolls 55 fast on shafts 57 journaled in bearings in the side frames. To drive these feed rolls, their shafts are provided with a pair of intermeshing gears 59, and on one of said shafts a sprocket wheel 61 is mounted connected by a sprocket chain 63 with a sprocket wheel 65 fast on the main shaft 41 referred to.

The distance between the bight between the creasing and cutting rolls 15 and the feed rolls 55 is somewhat less than the length of a bag blank, in order that the feed rolls may nip the leading end of the blank before the trailing end has left the creasing and cutting rolls, and thereby insure the feed of the blank over the table 49.

The blank on leaving the feed rolls 55 passes between a pair of vertical guide plates 67 (Fig. 1) extending between and connected to the side frame, and the leading portion of the blank is adapted to pass said guides and depend freely therefrom as indicated at 69 in Fig. 1.

Suitable means may be provided for folding the blank along the transverse crease 11 thereof to produce opposed sides of the bag. This means, in the present instance of the invention, comprises a folding member or plate 71 (Figs. 1 and 13) having forward outturned feet 73 with a recess 75 between them corresponding to the width of the bag. The plate 71 is adapted to slide in guides 76 carried by frames 76ª projecting inward from the side frames of the machine and secured thereto. To reciprocate the plate 71, the rear end thereof may be pivotally connected to a lever 77 fulcrumed on a stud 79 (Figs. 1 and 5) carried by brackets 81 depending from a plate 83 bridging the side frames and connected thereto. A follower or roller 85 carried by the lever 77 coöperates with a cam 87 fast on a shaft 89 journaled in brackets 91 mounted on the plate 83 and journaled in a bearing in one of the side frames of the machine. This shaft projects beyond said frame where it receives a sprocket wheel 93 connected by a sprocket chain 95 with a sprocket wheel 97 fast on the main shaft 41 of the machine. The roller 85 is pressed against the cam by a coil spring 99 having one end connected to a bracket 101 depending from the plate 83, and its opposite end connected to a strap 103 secured to the lower end of the lever 77.

The construction is such that in the course of the rotation of the cam 87, the lever 77 will be rocked toward the right of Fig. 1, thereby sliding the plate 71 toward the right of said figure and causing the forward end thereof to engage the crease 11 of the blank and fold the blank transversely to form the opposed sides of the bag. To receive the folded end of the blank, a pair of idler rolls 105 (Fig. 1) may be loosely mounted on shafts 107 mounted on the side frames in front of the folding plate 71, said rolls being spaced apart a sufficient distance to avoid the production of a sharp fold in the blank along the line 11.

Suitable means may be provided for feeding the folded blank longitudinally of the machine past devices to be described for folding over margins of the sides of the bag. This means, in the present instance of the invention, comprises an upper belt 109 and a lower belt 111 (Figs. 1, 2, 7 and 8) conveniently in the form of sprocket chains guided by a pair of sprocket wheels 113 fast on and driven by the shafts 35 and 41 referred to, and guided by a pair of sprocket wheels 115 fast on shafts 117 journaled in bearings on the side frames of the machine. Each of the links of the sprocket chains is provided with a foot 119 (Figs. 7 and 8) secured by a pair of screws 121 to a block 123 adapted to bear on circumferential flanges 125 of the sprocket wheels projecting laterally from the sprocket wheels as will be noted in Fig. 8. Working between the teeth of the sprocket wheels are shafts 127 mounted in the block 123 and having rollers 129 adapted to travel in tracks 131 (Figs. 6 and 12) carried by webs 133 mounted on cross bars 135 extending between and secured to the side frames of the machine. The construction is such that the belts are positively guided in their horizontal runs.

To insure frictional feeding effects of the feet 119, their outer faces may be provided with strips 137 of rubber or other suitable material.

When the bag blank is folded transversely to the length thereof and thrust between the idler rollers 105 and beyond the same, it will be brought to the position indicated at 139 (Fig. 7) where it may be gripped and fed by the opposed horizontal runs of the upper and lower feed belts. It is desirable that the feet 119 in gripping the leading end portion of the folded blank shall not produce a sharp transverse crease therein such as might weaken the bag. Accordingly, one of the rubber strips 137 is located back somewhat from the leading ends of the feet, so that, for example, the feet 141 will engage the blank a slight distance rearward from the transverse crease of the blank.

Mounted on the track carrying webs 123 referred to, are brackets 143 carrying opposed vertical side plates 145 (Figs. 2, 6 and 12) extending along opposite sides of the upper and lower feed belts, and have slits 147 between them sufficiently wide to allow marginal portions of the bag to project therethrough and beyond the side plates as will be noted in Fig. 9.

Suitable means may be provided to engage the leading end of the folded blank to fold the same along the diverging creases 13 and to fold opposed margins of the sides of the blank which project outward beyond the side plates 145, outward against the outer faces of said plates. This means, in the present instance of the invention, comprises vertical rollers 149 (Figs. 2, 4, 6 and 9) mounted on shafts 151 journaled in bearings in arms 153 fast on rock shafts 155 journaled in bearings in brackets 157 projecting outward from and secured to the track carrying webs 133.

It is desirable that the vertical rollers 149 shall be movable to their active positions adjacent the side plates 145 and away from said positions. To accomplish this, the shafts 155 are extended beneath the lower brackets 157 and have arms 159 fast thereon provided with rollers 161 engaging the peripheries of cams 163 (Figs. 2 and 4) fast on a shaft 165 journaled in bearings in the side frames of the machine. In the course of the rotation of these cams, projections 163ª thereon will engage the rollers 161 and rock the shafts 155 to move the vertical rollers 149 inward toward the side plates 145 to positions shown in Figs. 4 and 9. To rock the shafts 155 and move the vertical rollers 149 outward to their position shown in Fig. 6, coil springs 167 may be provided encircling the shafts 155 and having ends anchored to pins 169 fast on the shafts 155 and ends anchored to pins 171 on the lower brackets 157. Fast on the shafts 155 are collars 173 having shoulders 175 adapted to engage corresponding shoulders on the lower brackets 157. The construction is such that when the vertical rollers are moved inward, the coil springs 167 will be tensioned, and when the cam projections 163ª have passed beyond the rollers 161, the previously tensioned coil springs will become effective to rock the vertical rollers outward until limited by the engagement of the collar shoulders 175 with the corresponding shoulders on the lower brackets 157.

Suitable means may be provided for driving the cam shaft 165. To accomplish this, in the present instance, said shaft is provided with a sprocket wheel 177 (Fig. 2) connected by a sprocket chain 179 with a sprocket wheel 181 (Fig. 5) fast on the main driving shaft 41 of the machine.

As the folded blank is fed past vertical rollers 149, the latter will engage the leading folded end of the blank, as will be noted in Fig. 9, and fold the same along the creases 13 and fold the margins of the opposed sides of the blank outward against the outer faces of the side plates 145, thereby producing pockets 183 at the bottom corners of the bag and bringing the margins of the sides of the bag to the positions indicated at 185 in Fig. 17.

In the course of this folding operation, it is desirable to apply connecting strips 187 of paper or other suitable material to the margins with the leading ends of said strips projecting into the pockets 183. To accomplish this, in the present instance of the invention, spools 189 (Figs. 1 and 3) carrying the paper strips may be mounted on brackets 191 carried by the side frames of the machine adjacent the vertical rollers 149. The material may be conducted from said spools over guide rollers 193 (Fig. 10) carried by the brackets 191 and conducted thence through flat tubes 195 carried by said brackets toward the side plates 145.

Suitable means may be provided to feed the strip material at the proper times through the flat tubes 195 to present the leading ends of the strips into the bag pockets 183, as will be noted in Fig. 9. This means, in the present instance, comprises opposed feed rolls 197 (Fig. 10) fast on vertical shafts 199 having the upper ends journaled in bearings in the brackets 191, and their lower ends journaled in bearings carried by brackets 201 (Fig. 1) secured to the side frames of the machine. Fast on the lower ends of the shafts 199 are intermeshing gears 203, and certain of the shafts 199 project downward beyond their companion shafts and have bevel gears 205 fast thereon meshing with bevel gears 207 (Fig. 5) fast on a shaft 209 journaled in bearings in the side frames.

Each time a bag blank is fed past the vertical rollers 149, the feed rolls 197 should be driven to feed the strips 187 thereof. To intermittently rotate the feed rolls 197 for this purpose, a clutch device may be provided comprising a conical shell 211 (Figs. 5 and 14) having a hub 213 loose on the shaft 209 and carrying a sprocket wheel 215 connected by a sprocket chain 217 with a sprocket wheel 219 fast on the main driving shaft 41. Mating with the conical shell 211 is a cone 221 splined to the shaft 209 and movable into and out of frictional engagement with the conical shell as indicated in full and dotted lines in Fig. 14. A coil spring 223 encircles the shaft 209 and is confined between the conical shell 211 and the cone 221, and tends to open the clutch. To close the clutch, a toggle may be provided comprising a link 225 having one end pivotally connected to a ring 227 carried by a bracket 229 mounted on one of the side frames, and a link 231 having an end pivotally connected to a yoke 233 confined between flanges 235 on a sleeve 237 which may be integral with the cone 221. The other ends of the links 225 and 231 are pivotally connected to a bolt 239 projecting through an eye 241 in a block 243 pivotally connected to an upright lever 245 fulcrumed intermediate its ends on a stud 247 projecting laterally from the lower track carrying web 133. The upper end of the lever projects into the path of devices carried by the feet of the links of the lower feed belt 111 adapted to be controlled by a bag blank, so that said devices will operate to rock said lever and thereby automatically straighten the toggle and close the clutch and start the rotation of the feed rolls for the strips 187.

Each of the aforesaid devices comprises a rock arm 249 (Figs. 8, 8ª and 8ᵇ) having a bar 251 at one end thereof substantially equal to the length of the foot 119 and a rounded head 253. The rock arm 249 is mounted in a recess 255 at one side of the foot, and is fulcrumed intermediate its ends on a rod 257 mounted in said foot.

The construction is such that when a transversely folded bag blank is gripped between the opposed inner runs of the upper and lower belts, the blank will engage the head 253 and rock the rocker arm 249 from its dotted to its full line position shown in Fig. 8ª, thereby moving the bar 251 outward to its position where it projects beyond one of the sides of the foot. In the course of the travel of the foot, the bar 251 will reach the upper end of the toggle operating lever 245, and thereby rock said lever to straighten the toggle and close the clutch, thereby causing the strips 187 to be fed toward the outturned margins of the bag blank, and causing the leading ends of the strips to be introduced into the corner pockets 183, as will be noted in Figs. 9 and 17. When, however, the bag blank has been fed sufficiently to pass beyond the toggle operating lever 245, the head 253 of the rock arm 249 will no longer be engaged by the folded bag blank, and consequently, gravity will act on the bar 251 and rock the same downward from its full line to its dotted position shown in Fig. 8ª, where it will not act on the toggle operating lever. Therefore, the spring 223 previously energized on the closing of the clutch will become effective automatically to open the clutch and prevent the feed of strip material toward the side plates. Since each of the feet 119 is provided with a bar 251, a number of the bars will progressively act on the toggle operating lever to hold the toggle in straightened condition corresponding to the length of a bag blank, but if a blank is not present between the feed belts, the bars 251 will remain out of the path of the toggle operating lever, and therefore, will not operate thereon.

Suitable means may be provided automatically to sever the strip material at intervals, in order that the strips may be of the appropriate length for a bag blank. This means, in the present instance, comprises a knife 259 (Fig. 10) mounted on one of the feed rolls 197 and coöperating with an anvil 261 mounted on the feed roll opposed thereto. The circumference of each of these rolls equals the length of the strip required. As a consequence, in the course of each complete rotation of the feed rolls, the knife 259 will automatically sever the strip material to cut off a strip of the appropriate length.

To prevent the feed rolls from releasing the leading end of the strip material standing at the bight between the feed rolls after a strip is severed, spring-pressed pads 263 of rubber or other suitable material may be mounted in the feed rolls 197 adjacent the knife and its anvil and project somewhat beyond the peripheries of said rolls so as to nip the leading ends of the strip material and insure feed thereof the next time the feed rolls are driven.

The strips 187 may have their outer faces coated with a suitable adhesive which may be moistened to render the same effective to secure the strips to edge portions of the margins of the sides of the bag which are to be folded down into engagement with the gummed faces of said strips by means to be described. To moisten the gummed faces of the strips, appropriate moistening devices may be provided, in the present instance, comprising boxes 265 (Figs. 10 and 10ª) mounted on the guide tubes 195 referred to, and adapted to contain a supply of water. Wicks 267 project from the interior of the boxes over sides 269 thereof, and into slots 271 in the tubes 195. The lower ends of the wicks may be secured by suitable clamps 273 attached to the bottoms of the boxes, and the portions of the wicks projecting into the boxes may be held therein by frames 275 which may be tapered to grip the wicks against the walls 269 of the boxes. The construction is such that water will be drawn from the boxes by the wicks into the openings 271 in the tubes 195, so that as the strips are fed past the wicks, the gummed faces thereof will be properly moistened.

As the bag blank is fed by the feed belts past the vertical rollers 149, the portions of the strips 187 extending beyond the bag pockets 183 are guided and supported by guides 277 (Figs. 9 and 9ª) mounted on vertical plates 279 spaced somewhat from the side plates 145.

After the bag blank passes the vertical rollers 149, it is desirable that the edge portions of the margins of the sides of the bag shall be folded over substantially perpendicularly to the inner portions of said margins and assume the positions indicated at 281 in Fig. 18. To accomplish this, in the present instance of the invention, plates 283 (Figs. 6, 9 and 9ª) are provided projecting outwardly from and transversely to the side plates 145 at substantially equal distances above and beneath the slits 148 referred to, between the side plates. The plates 283 and the vertical plates 279 referred to, may be supported by arms 285 carried by upright brackets 287 (Fig. 6) mounted on the side frames of the machine.

Opposed to the transverse plates 283 are folding plates 289 having flanges 291 secured to the side plates 145, said folding plates being provided with deflecting portions 293 (Fig. 9) having ends meeting the side plates 145.

The construction is such that when the bag blank is fed past the upright rollers 149, the margins of the sides of the bag will engage the deflecting portions 293 of the folding plates 289 and the edge portions of said margins will be folded thereby over and outward onto the transverse plates 283, and as the blank continues to be fed, said portions will enter the spaces 295 between the transverse plates 283 and the folding plates 289. The blank will then be in the folded condition as shown in Fig. 18.

After the bag blank has been fed sufficiently far to cause the pockets 183 to pass the vertical rollers 149, said rollers are moved outward to their position shown in Fig. 6 by the cams 163 referred to, in order that the moistened gummed faces of the strips may not engage and adhere to said rollers.

Next it is desirable to apply an adhesive, preferably waterproof, such, for example, as black asphaltum, to the under faces of the triangular shaped portions 297 (Fig. 18) of the upper marginal portions 299. To accomplish this, in the present instance of the invention, the waterproof adhesive is conducted from a tank or other suitable source of supply (not shown) through vertical tubes 301 (Figs. 2 and 12) to rollers 303 on shafts 305 mounted in troughs 307 carried by brackets 309 secured to the side frames of the machine. The rollers 303 should normally stand out of the path of travel of the triangular portions 297 of the margins, but should momentarily stand in the path of said portions in order to apply the adhesive merely to said triangular portions. Suitable means may be provided for moving the adhesive applying rollers 303 into and out of the path of movement of said triangular portions. This means, in the present instance, comprises slides 311 carrying the troughs and rollers and connected to followers 313 which work in cam paths 315 on drums 317 fast on a shaft 319 journaled in bearings in the side frames of the machine. The cam paths have portions 321 to hold the rollers 303 in their inoperative positions, and curved portions 322 for moving said rollers momentarily into the path of the triangular portions 297 to be coated.

The circumference of each of the drums 317 equals the length of the bag blank when folded transversely and doubled as indicated in Fig. 16, and therefore, in the course of one complete rotation of each of the drums, the adhesive applying rollers will be moved into positions momentarily to engage the triangular portions 297 and then will be held away from the marginal portions 299 while the remainder of the length of the blank is passing said rollers.

In order that the adhesive applying rollers may be shifted into active positions at the proper times, it is desirable intermittently to give the cam drums 317 a complete rotation, that is, they should receive a complete rotation each time a bag blank passes the adhesive applying rollers 303. Suitable means may be provided for rotating these drums as described. In the present instance, this means comprises a sprocket wheel 325 (Figs. 2 and 12) fast on the shaft 319, and connected by a sprocket chain 327 with a sprocket wheel 329 fast on a shaft 331 journaled in bearings carried by the side frames of the machine. To drive the shaft 331, a sprocket wheel 333 (Fig. 5) is mounted thereon and connected by a chain 335 with a sprocket wheel 337 fast on the main shaft 41. The sprocket wheel 333 is adapted to be connected to the shaft 331 at the times required by a cone clutch 339 (Figs. 5 and 12) which may be similar to the cone clutch already described for controlling the drive of the gummed strip feed rolls, and therefore, detailed description of the clutch 339 is unnecessary. This clutch is adapted to be controlled by a toggle 341 connected to a lever 343 fulcrumed intermediate its ends on a stud 345 and extending upward so that the upper end thereof may be in the path of movement of the bars 251 referred to, carried by the feet of the lower belt.

The construction is such that when the leading end of the bag blank reaches the upper end of the lever 343, the bar 251 beneath the leading end of the bag blank will engage the lever 343 and rock the same to straighten the toggle 341 and close the clutch 339. The bars 251 on the following feet beneath the bag blank will hold the lever in position to maintain the clutch closed until the trailing end of the bag blank has passed the lever 343. While the bag blank is passing the lever therefor, the cam drums will receive a complete rotation and automatically move the adhesive applying rollers 303 into and out of their active positions, so as to apply the waterproof adhesive to the triangular portions 297 of the upper margins of the blank. After the bag blank has passed the lever 343, the toggle 341 will be released and the clutch 339 will be automatically opened.

Next it is desirable that the edge portions 281 of the upper margins shall be folded down and pressed sufficiently to cause the same to adhere to the gummed strips and to cause the triangular portions 297 to adhere to the adjacent portions of the pockets 183 of the bag. To accomplish this, the upper folding plates 289 referred to, are bent over gradually downward to present portions 347 (Figs. 9 and 9ᵇ) parallel to the side plates 145. Thus, as the blank is fed, the edge portions of the upper margins 281 will be folded over and downward and assume their positions indicated at 349 in Fig. 19.

Next it is desirable to apply an adhesive, preferably waterproof, such, for example, as black asphaltum, to the upper faces 351 (Fig. 19) of the edge portions of the lower margins 281. To accomplish this, in the present instance of the invention, tubes 353 (Fig. 12) are provided adapted to receive the adhesive from a tank or other source of supply (not shown), and to conduct the same to rollers 355 carried by shafts mounted on slides 357 movable in guides 359 mounted on brackets 361 secured to and projecting laterally from the lower track carrying web 133 referred to. Depending from and secured to the slides 357 are rollers 363 which work in cam paths 365 in drums 367 fast on a shaft 369 journaled in bearings in the side frames of the machine. The shaft 369 has a gear 371 fast thereon driven by a gear 373 fast on a shaft 375 journaled in bearings in side frames of the machine.

It is desirable that the adhesive applying rollers 355 shall be momentarily moved inward to apply adhesive to the triangular portions 377 of the edge portions of the lower margins of the blank, and then to move outward to apply the adhesive to the portions of the faces 351 indicated at 379. To give the rollers 355 appropriate movements for this purpose, the cam paths 365 may have portions 381 momentarily to adjust the rollers 355 inward to apply adhesive to the triangular portions 377, and portions 383 to hold said rollers in position to apply the adhesive to the face portions 379 as the bag blank is fed past said rollers.

The drums 367 have a circumference equal to the length of the blank when folded transversely to the length thereof as indicated in Fig. 16, and it is desirable that the drums shall be given a complete rotation each time a bag blank is fed past the adhesive applying rollers 355. Suitable means may be provided intermittently to rotate the drums 367 for this purpose. This means, in the present instance, comprises a sprocket wheel 385 (Figs. 5 and 12) on the shaft 375 referred to, and connected by a chain 387 with a sprocket wheel 389 fast on the main driving shaft 41. To connect the sprocket wheel 385 with the shaft 375 at the times required, a cone clutch 391 may be provided similar to the cone clutches referred to, and therefore, detailed description of this clutch 391 is unnecessary. To operate the clutch, it is connected to a toggle 393 adapted to be operated by a lever 395 fulcrumed on a stud 397 secured to the lower track carrying web 133. The upper end of the lever 395 projects in the path of a series of bars 399 (Fig. 8) carried by the feet 119 of the feed belts. These bars 399 are similar to the bars 251 and are similarly controlled, and therefore, detailed description thereof is unnecessary.

When a bag blank reaches the adhesive applying rollers 355, the leading edge of the blank will throw the bar 399 beneath it outward where it will engage the upper end of the lever 395 and rock said lever to straighten its toggle and close the clutch 391, thereby causing rotation of the cam drums 367. The bars 399 of the feet beneath the remainder of the bag will hold the lever in position to hold the clutch closed until the bag blank has passed the lever 395. Thereupon said lever will be released and the cone clutch 391 will be automatically opened and rotation of the cam drums 367 will cease. During the complete rotation of these drums the rollers 355 will apply the waterproof adhesive to the triangular portions 377 and the surfaces 379 as indicated in Fig. 19.

Next it is desirable to fold the edge portions 281 of the lower margins of the blank upward to their positions indicated at 399 in Fig. 20. When thus folded, the edge portions 281 will be pressed into adhesive engagement with the gummed strips, and the triangular portions 377 and faces 379 coated with a waterproof adhesive will be pressed against and adhere to the edge portions of the upper margins of the blank which have been previously folded over as already described.

Suitable means may be provided for folding up the edge portions of the lower margins of the blank. To this end the lower transverse plates 289 referred to, are provided with extensions comprising upwardly bent deflecting portions 401 (Fig. 9) and plates 403 (Figs. 9 and 9$^c$) projecting vertically upward and parallel to the side plates 145. The construction is such that as the leading ends of the edge portions of the lower margins of the blanks pass the adhesive applying rollers 355, they will engage the deflecting portions 401 and the plates 403 and be folded upward to their positions indicated at 399 in Fig. 20.

It is desirable that the overlapping margins of the bag shall be pressed together and against the gummed strips to insure proper adhesive engagement thereof. To accomplish this, in the present instance, a pair of rollers 405 (Figs. 2 and 4) may be mounted on shafts journaled in boxes 407 adapted to slide in guides 409 on brackets 411 projecting inward from and secured to the side frames of the machine. The rollers are yieldingly pressed against the side plates 145 by coil springs 413 on the boxes of the rollers. After the bag passes the rollers 405 it is completed, but is H-shaped in section.

To facilitate stacking of the bags in compact condition, it is desirable to fold the margins at one edge of the bag in one direction, and the margins of the other edge of the bag in the opposite direction over into the plane of the collapsed sides of the bag, so that the bag will assume the condition shown in Fig. 21. To accomplish this, in the present instance, the bag blank is fed past a pair of deflecting plates 415 (Figs. 2, 4 and 11) secured to the side plates 145, and in the course of the passage of the bag past these deflecting plates 415, the margins at the opposite edges of the bag will be folded over to assume their positions indicated at 417 in Fig. 21. To press the collapsed bag and contribute to the flat condition thereof, a pair of feed rolls 419 (Figs. 2 and 4) may be provided fast on shafts 421 journaled in bearings carried by the side frames of the machine. Intermeshing gears 423 are mounted fast on the shaft 421, and one of the shafts has a sprocket wheel 425 fast thereon connected by a sprocket chain 427 with a sprocket wheel 429 fast on the shaft 117 for the upper feed belt. The construction is such that the feed rolls 419 will catch the leading end of the collapsed bag and feed the bag through said rolls and press the same into desirable flat condition. On emerging from the feed rolls 419, the flat bags may pass over a deflecting plate 431 (Fig. 2) and be received by a table 433 carried by the side frames of the machine.

It is believed that the operation of the machine will be readily understood without further elucidation thereof.

By my invention a bag blank may be easily, quickly and efficiently folded transversely to the length thereof, margins of the sides may be folded over into overlapping relation, connecting strips may be introduced into the interior of the bag to secure the margins strongly together, and the margins may be further secured by a waterproof adhesive exposed at outer seams of the bag but effective to prevent ingress of moisture to the gummed connecting strips. In the course of the folding over of the margins of the sides of the bag, the bottom corners of the bag may be formed and a form of bottom may be provided, such that there are no seams on the bottom to be exposed to wear and moisture. The bag when opened up will assume the form shown in Fig. 22, and the construction thereof is such that it constitutes a strong, simple, efficient container adapted to hold cement and many other materials, and to protect the same from moisture.

It will be understood that the invention is not limited to the specific embodiment shown, and that various deviations may be made therefrom without departing from the spirit and scope of the appended claims.

What is claimed is:—

1. A bag making machine, comprising, in combination, means to feed a sheet of bag material, means to crease the sheet at intervals transversely and obliquely to the length thereof, means to sever the sheet at intervals to produce bag blanks, means to fold a blank on a transverse crease thereof to form opposed sides of the bag, means to fold the sides on the oblique creases and longitudinally thereof, means to apply gummed strips to said sides, means to fold margins of one of said sides over and into adhesive engagement with said strips, means to apply waterproof adhesive to margins of the other side, and means to fold the latter margins over and into adhesive engagement with said strips and the former margins.

2. A bag making machine, comprising, in combination, means to feed a bag blank, means to fold the blank transversely to the length thereof to form opposed sides of the bag, means to fold margins of said sides longitudinally thereof into overlapping engagement, means adhesively to secure strips to said margins to connect the sides, and means to apply a waterproof adhesive to margins of one of said sides and to secure the same to the margins of the other side.

3. A bag making machine, comprising, in combination, means to feed a bag blank folded transversely to form opposed sides of a bag, means to fold the longitudinally-extending margins of said sides at right angles to the portion of the bag lying intermediate thereof and with said margins in overlapping engagement with each other, and means to apply adhesive to said margins to secure the sides together.

4. A bag making machine, comprising, in combination, means to feed a bag blank, means to fold the blank transversely to the length thereof to form opposed sides of the bag, means to fold over margins of said sides against portions of said sides adjacent to said margins, and means to apply strips to said margins to secure the opposed sides together.

5. A bag making machine, comprising, in combination, means to feed a bag blank, means to fold the blank transversely to the length thereof to form opposed sides of the bag, means to fold over margins of said sides into overlapping engagement, and means to apply strips to said margins to secure the opposed sides together.

6. A bag making machine, comprising, in combination, means to fold a bag blank transversely to the length thereof to form opposed sides of the bag, means to fold over margins of said sides into overlapping engagement, and means to apply and adhesively secure strips to said margins to secure the opposed sides together.

7. A bag making machine, comprising, in combination, means to feed a bag blank, a slide member, means to reciprocate said slide member and cause the same to engage the blank and fold the same transversely thereof to form opposed sides of the bag, folding devices for the margins of said sides, feeding means to receive the blank after being folded by said slide member and to move the blank past said devices to render the latter effective to fold said margins, and means adhesively to secure the margins of the opposed sides together.

8. A bag making machine, comprising, in combination, means to feed a bag blank, a slide member, a guide for said slide member, means to reciprocate said member to cause the same to engage said blank and fold the same transversely thereof intermediate its ends to form opposed sides of the bag, and means to fold longitudinally-extending margins upon opposite sides of the bag back upon themselves into overlapping relation.

9. A bag making machine, comprising, in combination, means to feed a bag blank, a slide member, a guide therefor, cam means operatively connected with said slide member to move the latter into engagement with the blank to fold the latter transversely thereof and form opposed sides of the bag, and means to receive the blank thus folded and to fold the margins of the sides back upon themselves into overlapping engagement with each other.

10. A bag making machine, comprising, in combination, a reciprocatory folding member, means to feed a bag blank in front of said member, means to cause said folding member to fold the blank transversely thereof intermediate the ends thereof to form opposed sides of the bag, a pair of feed belts for receiving the folded blank between them, and means coöperating with said feed belts to fold each of the adjacent margins of the sides over into overlapping relation.

11. A bag making machine, comprising, in combination, a pair of feed belts for receiving and feeding forward a folded blank, means for presenting to the feed belts a bag blank folded transversely to form opposite sides of a bag, and deflecting plates at opposite sides of said belts for folding the adjacent margins of the sides of the bag over into overlapping relation with each other.

12. A bag making machine, comprising, in combination, means to fold a bag blank transversely thereof to form opposed sides of a bag, a pair of feed belts to receive the folded blank, pairs of plates at opposite sides of said belts, each pair of plates having a space to receive the folded blank, and devices adjacent said plates for folding over margins of the sides of the bag projecting beyond said plates into overlapping relation.

13. A bag making machine, comprising, in combination, means to fold a bag blank transversely thereof to form opposed sides of a bag, means to receive the folded blank and feed the same, and means to engage said fold adjacent the edge of the blank as it is fed by said feed means, and thereby fold margins of said sides over to positions at substantially right angles to the body of the blank.

14. A bag making machine, comprising, in combination, means to fold a bag blank transversely thereof to form opposed sides of a bag, means to receive the folded blank and to feed the same, pairs of plates at opposite sides of said feed means having spaces to receive the folded blank, and means coöperating with said plates to engage corner portions of the folded end of the bag blank, and fold margins of the sides of the bag outward against said plates.

15. A bag making machine, comprising, in combination, means to fold a bag blank transversely thereof to form opposed sides of a bag, a pair of belts to receive the folded blank and feed the same, upright plates at opposite sides of said belts having spaces to receive the folded blank, devices for folding margins of the sides of the bag outward against said upright plates, and plates extending transversely to said upright plates for folding the margins over into overlapped relation as the folded bag blank is fed by said belts past said plates.

16. A bag making machine, comprising, in combination, means to fold a bag blank transversely thereof to form opposed sides of a bag, a pair of feed belts to receive the folded blank and feed the same, upright plates at opposite sides of said belts having slits to receive the blank, means coöperating with said upright plates to fold margins of the sides of the bag outward against said plates, and means to apply connecting strips to said margins as they are so folded.

17. A bag making machine, comprising, in combination, means to fold a bag blank transversely thereof to form opposed sides of a bag, a pair of feed belts to receive the folded bag and feed the same, plates at opposite sides of said belts having slits to receive the blank, means to fold margins of the sides outward against said plates, means to apply gummed strips to said margins, means to moisten said gummed strips, and means to fold said margins over into adhesive engagement with said strips as the blank is fed by said belts.

18. A bag making machine, comprising, in combination, means to fold a bag blank transversely thereof to form opposed sides of a bag, a pair of belts to receive the folded blank between the same, plates at opposite sides of said belts having slits to receive the blank, devices coöperating with said plates to fold margins of the sides projecting beyond said slits outward against said plates, means to apply an adhesive to the margins of one of said sides, and means to fold the margins of the sides over to cause the adhesive to secure the margins together.

19. A bag making machine, comprising, in combination, means to fold a bag blank transversely thereof to form opposed sides of a bag, a pair of feed belts to receive the folded blank between them and feed the blank, plates at opposite sides of said belts having slits to receive margins of the sides of the bag, means coöperating with said plates to fold said margins outward against said plates, means to apply connecting strips to said margins, means to fold said margins over against said strips, means adhesively to connect said strips with said margins, means to coat the margins of one of said sides with a waterproof adhesive, and means to press margins of the other side against said waterproof adhesive.

20. A bag making machine, comprising, in combination, means to fold a bag blank transversely thereof to form opposed sides of a bag, means to receive the folded blank and feed the same, means to fold margins of the sides over into overlapped relation, and means to apply and adhesively to secure strips to inner faces of said margins to connect the same.

21. A bag making machine, comprising, in combination, a pair of feed rolls, one having a projection and the other having a groove mating therewith for transversely creasing a bag blank, means to fold the blank on the transverse crease thereof to form opposed symmetrical sides of the bag, means to fold over margins of said sides into overlapping relation to form ends of the bag, and means to secure said margins together.

22. A bag making machine, comprising, in combination, a pair of feed rolls, one having a projection and the other having a groove mating therewith automatically to crease a bag blank on a line transversely thereof and on diverging lines meeting the ends of the transverse line, means to fold a blank on said transverse line to form opposed symmetrical sides of the bag, feeding means to receive the folded blank from said folding means, and means coöperating with said feeding means to fold the blank on said oblique lines to form bottom ends of the bag.

23. A bag making machine, comprising, in combination, a table, a pair of rolls to feed bag blanks along said table, one of said rolls having a projection and the other having a groove to crease the blank transversely thereof, a pair of feed rolls to receive the blanks as they are fed over said table, means to fold the blanks on the transverse creases thereof to form opposed sides of the bags, feeding means to receive the folded blanks from said folding means, and folding plates at opposed sides of said feeding means formed and arranged automatically to fold over margins of opposed sides of the bag into overlapped relation as the blank is fed relatively to said plates by said feeding means.

24. A bag making machine, comprising, in combination, means to feed a bag blank, means to fold the blank transversely to the length thereof to form opposed sides of the bag, feeding means to receive the folded blank, upright plates at opposite sides of said feeding means having slits between them through which margins of the opposed sides of the blank may project beyond said plates, a pair of upright members to engage the folded end of the blank and fold margins of the opposed sides of the blank outward against said plates, and means automatically to move said upright members intermittently toward and from said plates.

25. A bag making machine, comprising, in combination, means to fold a bag blank transversely to the length thereof to form opposed sides of the blank, feeding means to receive the folded blank and feed the same therefrom, means to fold over margins of said sides into overlapping relation, and means to apply gummed strips to said margins to secure the same together, including feeding means for said strips and controlling means for starting and stopping said feeding means under the control of the bag blank when fed by said feeding means.

26. A bag making machine, comprising, in combination, means to fold a bag blank transversely to the length thereof to form opposed sides of the bag, a pair of opposed belts to receive the folded blank and feed the same, means coöperating with said belts to fold over margins of said sides into overlapping relation, means to supply connecting strips for securing said margins together, feeding means for said strips, and operating means for said feeding means including devices carried by said belts controlled by bag blanks between opposed runs of said belts.

27. A bag making machine, comprising, in combination, means to fold a bag blank transversely to the length thereof to form opposed sides of the bag, a pair of feed belts having opposed runs to receive the folded blank between them, means coöperating with said feed belts to fold over margins of said sides into overlapping relation, and means to apply strips to secure said margins together, including feed means, a clutch for said feed means, and operating means for said clutch including devices on one of said feed belts movable to and from operative position under the control of the bag blank between said belts, and a member adapted to be operated by said devices to close the clutch and feed said strips when said devices are in operative position.

28. A bag making machine, comprising, in combination, means to fold a bag blank transversely thereof to form opposed sides of a bag, means to receive the folded blank and feed the same, means coöperating with said feed means to fold margins of the sides of the bag over into overlapped relation, means to apply an adhesive to portions of the blank adjacent the folded end thereof, and means under the control of the blank for automatically rendering said adhesive applying means effective intermittently.

29. A bag making machine, comprising, in combination, means to fold a bag blank transversely thereof to form opposed sides of a bag, feeding means to receive the folded blank and feed the same, means coöperating with said feeding means to fold over margins of opposed sides of the bag into overlapped relation, means to apply an adhesive to the margins of one of said sides, and means controlled by the blank for automatically rendering said adhesive applying means intermittently effective.

30. A bag making machine, comprising, in combination, means to fold a bag blank transversely thereof to form opposed sides of the bag, a pair of feed belts having opposed runs for receiving the folded blank and feeding the same, upright plates at opposite sides of said feed belts having slits to receive margins of the blank, means coöperating with said plates to fold margins of the opposed sides of the blank outward and then over toward one another into overlapped relation, and form a bag having an H-shaped section, and means to fold opposed parts of the bag over toward the central portion thereof to cause the bag to assume a flat condition.

31. A bag making machine, comprising, in combination, means to receive a bag blank folded transversely to form opposed sides of a bag and to feed the same, folding means adjacent said blank feeding means positioned to engage the margins of said sides to fold the same laterally away from each other, and additional folding means for folding a portion of said margins back toward each other.

32. A bag making machine comprising, in combination, means to fold a bag blank transversely thereof to form opposed sides of a bag, means to receive the folded blank and to feed the same, folding means adjacent said blank feeding means positioned to engage the margins of said sides to fold the same laterally away from each other, and additional folding means for folding a portion of said margin back into overlapping engagement with each other.

33. A bag making machine comprising, in combination, means to fold a bag blank transversely thereof to form opposed sides of a bag, means to receive the folded blank and to feed the same, folding means adjacent said blank feeding means positioned to engage the margins of said sides to fold the same laterally away from each other, additional folding means for folding a portion of said margins back toward each other, and an adhesive strip for securing the portions of said margins extending toward each other together.

34. A bag making machine comprising, in combination, means to feed a bag blank folded transversely to form opposed sides of a bag, means to fold the adjacent marginal portions of said folded blank outward away from each other, means for folding a portion of said marginal portions back toward each other, and means for securing said folded back portions together to form the ends of the bag.

35. A bag-making machine comprising, in combination, means to fold a bag blank transversely thereof to form opposed sides of a bag, means to receive the folded blank and feed the same with its folded edge forward, means to fold the adjacent marginal portions of said sides away from each other, said marginal folding means operable to form a pocket adjacent said folded edge, and means to deliver an adhesive-securing strip to said marginal portions with the leading end of the strip entering said pocket.

36. A bag-making machine comprising, in combination, means to fold a bag blank transversely thereof to form opposed sides of a bag, means to receive the folded blank and feed the same with its folded edge forward, means to fold the adjacent marginal portions of said sides away from each other with a pocket formed adjacent said folded edge, and strip guide means extending toward said pocket for delivering an adhesive-securing strip to said marginal portions with an end of the strip entering the pocket.

37. A bag-making machine, comprising in combination, means to fold a bag blank transversely thereof to form opposed sides of a bag, means to feed the folded blank forward, means to fold the adjacent marginal portions of said sides away from each other, and strip guides extending toward the edge formed by the outward marginal fold to deliver an adhesive-securing strip to said marginal portions.

In testimony whereof, I have signed my name to this specification.

CHARLES H. HOWARD.